United States Patent
Soleimani et al.

[11] Patent Number: 5,678,228
[45] Date of Patent: Oct. 14, 1997

[54] SATELLITE TERMINAL WITH SLEEP MODE

[75] Inventors: Mohammad Soleimani, Tehran, Islamic Rep. of Iran; John E. Corrigan, Chevy Chase, Md.

[73] Assignee: Hughes Aircraft Co., Los Angeles, Calif.

[21] Appl. No.: 398,842

[22] Filed: Mar. 6, 1995

[51] Int. Cl.⁶ .................... H04H 1/04; H04B 1/16
[52] U.S. Cl. .................... 455/343; 455/3.2; 455/12.1; 455/38.3
[58] Field of Search .................... 455/3.2, 3.3, 5.1, 455/12.1, 13.4, 15, 17, 21, 38.3, 67.1, 115, 127, 227, 229, 343, 10; 348/725, 723, 726

[56] References Cited

U.S. PATENT DOCUMENTS

| | | | |
|---|---|---|---|
| 3,962,553 | 6/1976 | Linder et al. | 455/38.3 |
| 4,934,983 | 6/1990 | Miyo | 455/10 |
| 5,031,231 | 7/1991 | Miyazaki | 455/127 |

FOREIGN PATENT DOCUMENTS

| | | | |
|---|---|---|---|
| 6-164461 | 6/1994 | Japan | 455/3.2 |

*Primary Examiner*—Reinhard J. Eisenzopf
*Assistant Examiner*—Nguyen Vo
*Attorney, Agent, or Firm*—John T. Whelan; Wanda K. Denson-Low

[57] ABSTRACT

A remote ground terminal for transmitting a modulated data signal to a satellite. The remote ground terminal comprises a source of data signals, a demodulator for receiving a data signal and coupling the data signal to a transmitter, and for producing a power control signal during the period the data signal is present at an input of the demodulator. The power control signal is coupled to the transmitter and controls the operation of the transmitter such that the transmitter only receives power when the demodulator produces the power control signal. During the period the transmitter receives power, it functions to provide and modulate a carrier signal in accordance with the data signal received from the source of data signals.

18 Claims, 3 Drawing Sheets

SATELLITE TERMINAL WITH SLEEP MODE

BACKGROUND OF THE INVENTION

Satellite communication systems typically have employed large aperture antennas and high power transmitters for establishing an uplink to the satellite. Recently, however, very small aperture antenna ground terminals, referred to as remote ground terminals, have been developed for data and voice transmission at low rates. Typically, in such systems, the remote ground terminals are utilized for communicating via a satellite from a remote location to a central hub station. The central hub station communicates with multiple remote ground terminals, and has a significantly larger antenna aperture, as well as a significantly larger power output capability than any of the remote ground terminals. In some applications, especially where path transit delay is critical, such as voice communications, direct remote ground terminal to remote ground terminal arrangements are utilized.

The viability of the remote ground terminal concept increases as the cost for providing a remote ground terminal at the remote location decreases. In pursuit of this objective, various techniques have been utilized to reduce the cost of the remote ground terminal. For example, U.S. Pat. No. 5,208,829 describes a spread spectrum technique that maximizes the power output from a satellite so as to allow a cost saving reduction in the size of the antenna of the remote ground terminal. U.S. Pat. No. 5,309,479 describes a remote ground terminal comprising a low cost transmitter for producing an FSK (frequency-shift keying) modulated uplink signal which is utilized to communicate with the central hub station via the satellite.

Notwithstanding these cost saving techniques, a problem remains in that the prior art remote ground terminals typically comprise phase-locked loops and other temperature sensitive components, for example, linear power amplifiers, necessary for the generation of the modulated uplink signal. These phase-locked loops and temperature sensitive components are continuously provided power (i.e., turned on) so as to maintain the desired accuracy of the output signal of the phase-locked loops, as well as maintain the temperature sensitive components at a constant temperature. As such, the prior art remote ground terminals consume significant power even when the unit is not transmitting or receiving any signals (i.e., the stand-by mode), thereby unduly increasing the cost of operating the remote ground terminal.

Remote ground terminals typically transmit data in short bursts followed by idle periods. One important application for remote ground terminals is monitoring of remote equipment (e.g. oil pipelines). The reduction of the remote ground terminal's power consumption is critical to operation at such remote locations due to the unavailability of commercial power. Reduced power consumption also enables the physical size of the transmitter to be reduced.

Accordingly, in order to reduce the cost of operation and increase the operational efficiency of remote ground terminals, there exists a need for a remote ground terminal which does not require the phase-locked loops and the temperature sensitive components to be coupled to a power supply (i.e., powered on) when the remote ground terminal is in the stand-by mode.

SUMMARY OF THE INVENTION

The present invention provides a remote ground terminal for transmitting and receiving modulated data signals designed to satisfy the aforementioned needs. Specifically, the invention comprises a novel design that is simple, eliminates the need for the phase-locked loops and the temperature sensitive components to receive power continuously, increases power efficiency such that remote ground terminals are capable of operating under solar power and substantially reduces the overall cost of operating the remote ground terminal relative to the prior art designs.

Accordingly, the present invention relates to a remote ground terminal for transmitting a modulated uplink signal to a satellite. In a first embodiment, the remote ground terminal comprises a source of data signals, a demodulator for receiving a data signal and coupling this data signal to a transmitter, and for producing a power control signal during the period the data signal is present at the input of the demodulator. The power control signal controls the operation of the transmitter such that the transmitter only receives power when the demodulator produces the power control signal. During the period the transmitter receives power, it functions to provide and modulate a carrier signal in accordance with the data signal received from the source of data signals.

The present invention also relates to a method for transmitting a modulated uplink signal to a satellite, which comprises receiving a data signal from a data source, coupling the data signal from the data source to a demodulator which generates a power control signal during which period the data signal is presented to the input of the demodulator and power is provided to a transmitter. Another signal, referred to as the carrier control signal, operates to provide and control a carrier signal in accordance with the data signal received by the demodulator.

As described in detail below, the remote ground terminal of the present invention provides important advantages. Most importantly, the present invention minimizes the power consumption of the remote ground terminal by turning off (i.e., disconnecting the power supply) the phase-locked loops and the temperature sensitive components of the transmitter in the standby mode. As a result, the remote ground terminal of the present invention provides a substantial power savings in relation to prior art devices.

The invention itself, together with further objects and attendant advantages, will best be understood by reference to the following detailed description, taken in conjunction with the accompanying drawings.

DETAILED DESCRIPTION OF THE DRAWINGS

Figure 1:
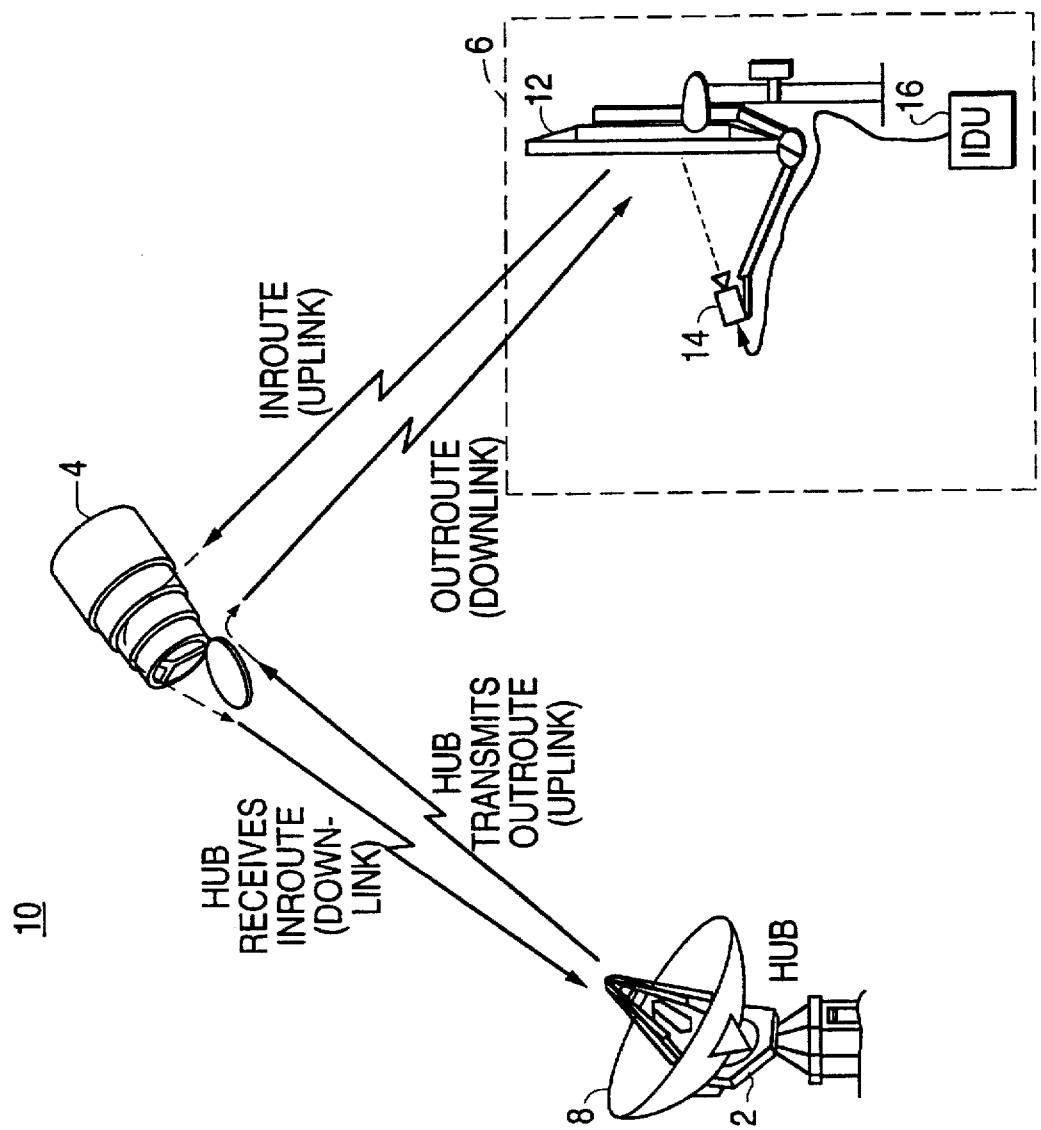
FIG. 1 is a block diagram of a very small aperture terminal ("VSAT") satellite communication network which utilizes the present invention.

The VSAT satellite communication network 10 illustrated in FIG. 1, comprises a central hub station 2, a communication satellite 4, and a plurality of remote ground terminals 6 (only one is shown). The VSAT network 10 functions as a two way transmission system for transferring data and voice communications between the central hub station 2 and the numerous remote ground terminals 6. All data is transferred between the central hub station 2 and the remote ground terminals 6 via transponders located in the satellite 4.

Signals transmitted from the central hub station 2 to the remote ground terminals 6 are referred to as "outroute", while signals transmitted in the opposite direction are referred to as "inroute".

As stated, the central hub station 2 supports a plurality of remote ground terminals 6. The central hub station 2 comprises a large antenna 8 so as to allow for the transmission of a signal sufficiently strong such that the signal can be received by the remote ground terminals 6 which have relatively small antennas. The large antenna 8 of the central hub station 2 also compensates for the relatively weak signals (inroute) transmitted by the remote ground terminals 6.

As shown in FIG. 1, the communication satellite 4 functions as a microwave relay. It receives uplink signals from both the central hub station 2 and the remote ground terminals 6 at a first frequency and then retransmits the signal at a second frequency. The satellite 4 comprises a transponder which receives, amplifies and retransmits each signal within a predefined bandwidth. The transponders of the VSAT network 10 shown in FIG. 1 can operate in various frequency bands, for example Ku and C band.

The remote ground terminal 6 comprises a small aperture antenna 12 for receiving and transmitting the downlink and uplink signals, respectively; an outdoor unit 14 typically mounted proximate the antenna 12 which comprises a transmitter for producing and transmitting a modulated uplink signal; and an indoor unit 16 which operates as an interface between the user's communication equipment (e.g., data terminals, personal computers, monitoring equipment and telephone equipment) and the outdoor unit 14.

More specifically, the indoor unit 16 receives data from the user's equipment (not shown in FIG. 1) and transfers this data to the outdoor unit 14. The transmitter of the outdoor unit 14 functions to produce and modulate a carrier signal in accordance with the data received from the indoor unit 16 and then transmit this signal (i.e. uplink) to the satellite 4. Upon receipt by the central hub station 2, the modulated carrier signal is demodulated such that the data transmitted from the remote user is reproduced and processed by the central hub station 2.

The present invention provides an outdoor unit 14 which provides DC power to the components forming the transmitter 20 only when necessary for data to be transmitted to the satellite 4. As a result, the transmitter 20 components do not consume power when the remote ground terminal 6 is in the stand-by mode. This power-off technique provides a substantial reduction in the power consumed during operation of the remote ground terminal 6.

Figure 2:
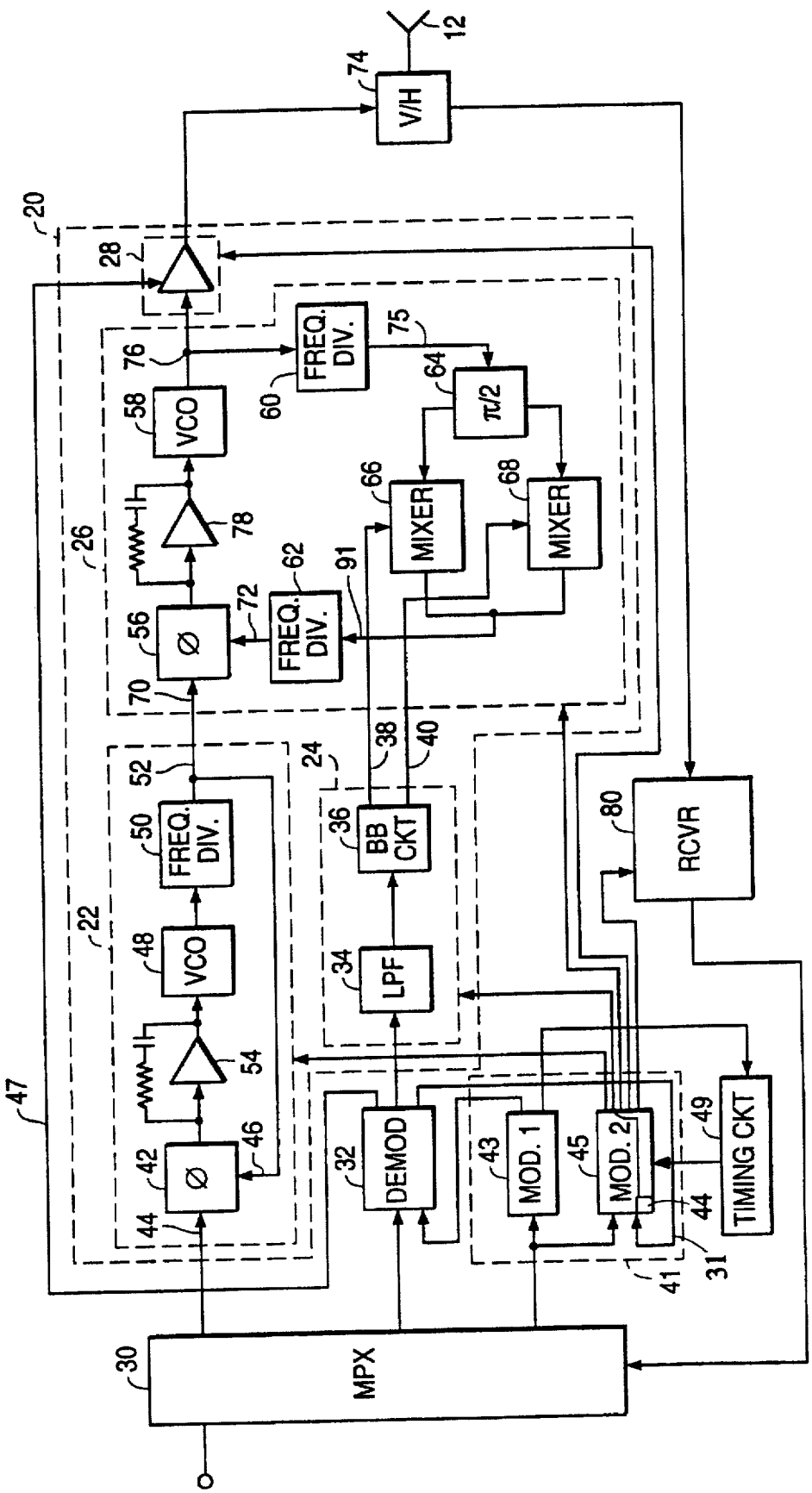
FIG. 2 is a schematic diagram of one embodiment of a portion of a remote ground terminal of the present invention.

As shown in FIG. 2, the transmitter 20 of the outdoor unit 14 comprises a phase-locked loop circuit 22 for generating a first intermediate frequency (IF) signal 52, a source 24 for supplying data signals to be modulated onto a carrier signal, a modulator 26 for producing the modulated carrier signal and a power amplifier 28 for amplifying the modulated carrier signal.

In addition to the transmitter 20 described above, the outdoor unit 14 also comprises a multiplexor 30, a demodulator 32 and a power supply circuit 41. When data needs to be transmitted to the central hub station 2, the indoor unit 16 generates and transmits a signal to the outdoor unit 14 via a cable. This signal, which is received by the multiplexor 30 of the outdoor unit 14, provides a 111 MHz reference signal, DC power and 40 MHz modulated control signal to the outdoor unit 14. As shown in FIG. 2, the multiplexor 30 couples the 111 MHz reference signal to the input of the phase-locked loop circuit 22 of the transmitter 20, couples the 40 MHz control signal to the demodulator 32, and couples the DC power signal to the input of the power supply circuit 41.

The power supply circuit 41 comprises a first module 43 which receives the DC signal output by the multiplexor 10 as an input and has an output coupled to the demodulator 32 so as to provide power to the demodulator 32 upon receipt of the DC signal. The power supply circuit 41 further comprises a second module 45 having an input coupled to the demodulator 32 for receiving a power control signal 31. The output of the second module 45 of the power supply circuit 41 are coupled components of the transmitter 20, as well as the components of the receiver chain 80.

The 40 MHz control signal serves four purposes: 1) its presence as detected by the demodulator 32 causes the power supply circuit 41 to provide DC power to the components forming the transmitter 20; 2) it transfers the data to be modulated onto the carrier signal from the indoor unit 16 to the outdoor unit 14; 3) it provides a carrier control signal 47 from the demodulated data which is used to turn on (and of) the power amplifier 28 of the transmitter 20; and 4) it provides a receiver timing signal which is utilized to control the coupling of power to the components of the receiver chain 80.

More specifically, upon receipt of the 40 MHz signal from the indoor unit 16, the demodulator 32 produces the power control signal 31 which is coupled to a second module 45 of the power supply circuit 41. Upon receipt of the power control signal 31, the second module 45 provides power to the components of the transmitter 20. Thus, when the power control signal 31 is active, the components of the transmitter 20 are coupled to a power supply. If the power control signal 31 is inactive, the transmitter 20 components are isolated from the power supply and therefore do not consume any power.

As the phase-locked loops of the transmitter 20 are relatively wide band, the time required to go from power off to transmitting is very short. Accordingly, data can be transmitted almost immediately after the demodulator 32 detects a data signal.

There are numerous methods of implementing the foregoing power control scheme. In one embodiment the demodulator 32 comprises a detector which produces a logic signal, for example TTL, in response to the presence or absence of the 40 MHz signal at the input of the demodulator 32. Specifically, the detector outputs a logic high when the 40 MHz signal is received by the demodulator 32, and a logical low when the 40 MHz signal is not received. This logic signal functions as the power control signal 31 mentioned above and is coupled to a power switch 44 resident in the second module 45 of the power supply circuit 41 of the outdoor unit 14.

Each power switch 44 comprises, for example, a transistor having a base terminal for receiving the logic signal output by the demodulator 32, a collector terminal coupled to a power source, and an emitter terminal coupled to a power line which is coupled to the individual components of the transmitter 20. As such, when the 40 MHz signal is received by the demodulator 32, the detector outputs a logic high which turns on the power switch 44 in the second module 45 of the power supply circuit 41, thereby connecting the power source to the components of the transmitter 20. When the 40 MHz signal is not present (i.e. the unit is in stand-by), the power switch 44 remains open. Thus, the transmitter 20 components are not coupled to a power supply and are therefore turned off.

Power reduction in the receiver chain 80 can also be achieved in a similar manner to that described above. However, when controlling power to the receiver chain 80, it is important to switch the power off and on at regular, pre-defined intervals in synchronization with the outroute transmissions from the central hub station 2. As such, the remote ground terminal 6 is able to receive signals transmitted by the central hub station 2.

To accomplish this task, the outdoor unit 14 further comprises a timing circuit 49 coupled to the second module 45 of the power supply circuit 41. The timing circuit 49 functions to control when the power supply circuit 41 can provide power to the receiver chain 80. In one embodiment, the second module 45 of the power supply circuit 41 comprises a second power switch (not shown) which operates to couple the power supply to the receiver chain 80. Of course, the power supply can provide different supply voltages as required by the components of the transmitter 20 and receiver chain 80.

As shown in FIG. 2, the timing circuit 49 is coupled to the output of the first module 43 of the power supply circuit 41. Importantly, when the DC signal is present at the input of the first module 43, the timing circuit 49 controls the second module 45 of the power supply circuit 41 to disconnect the power from the receiver chain 80. The timing circuit 49 also functions to control the second module 45 of the power supply circuit 41 to connect the receiver chain 80 to the power supply at regular predefined intervals so as to allow for the reception of incoming signals.

The operation of the other components of the indoor unit 14 of the VSAT network of FIG. 1 is now described.

The demodulator 32 of the outdoor unit 14 of the present invention also demodulates the 40 MHz signal so as to recreate the digital data forwarded by the indoor unit 16. The recreated digital signal is output by the demodulator 32 at a second output port and coupled to the input of the data source 24 of the transmitter 20.

The data source 24 comprises a low pass filter 34 and a baseband circuit 36 which are coupled in series. The baseband circuit 36 produces baseband analog quadrature signals 38,40 in accordance with the digital data input signal. The baseband analog quadrature signals 38,40 are coupled to the modulator 26 and are utilized to modulate the carrier signal. In one embodiment, the baseband circuit 36 generates the baseband analog quadrature signals 38,40 via read only memory and comprises a pulse shaping filter for filtering the baseband analog quadrature signals.

The phase-locked loop circuit 22 of the transmitter 20 comprises a phase comparator 42 having a first and second input 44,46, a voltage controlled oscillator 48 and a frequency divider 50. The phase-locked loop circuit 22 functions to produce the first IF signal 52 which is coupled to the modulator 26. As shown in FIG. 2, in the present embodiment one input 44 of the phase comparator 42 receives the 111 MHz signal output by the indoor unit 16 via the multiplexor 30. The output of the phase comparator 42 is coupled to the input of the voltage controlled oscillator 48 via a low pass filter 54. The output of the voltage controlled oscillator 48 is coupled to the frequency divider 50, and the output of the frequency divider 50 is coupled to the second input 46 of the phase comparator 42 to complete the phase-locked loop.

The modulator 26 of the present embodiment comprises a phase comparator 56, a voltage controlled oscillator 58, a first and second frequency divider 60,62, a quadrature hybrid 64 and a first and second mixer circuit 66,68 operating as part of a second phase-locked loop. The modulator 26 functions to receive the baseband analog quadrature signals 38,40, modulate the 1.7 GHz error signal with them, and impress these data signals on the first IF signal 52 which is then multiplied to the desired carrier frequency by the action of the phase-locked loop so that it can be transmitted to the satellite 4. Furthermore, in the present embodiment, the modulator 26 and the phase-locked loop 22 form a series of phase-locked loops responsive to the 111 MHz input so as allow the frequency of the modulated carrier signal 76 to vary by predefined steps to accommodate the frequency division multiple access techniques utilized by the VSAT network 10.

Referring to FIG. 2, the first IF signal 52 produced by the phase-locked loop circuit 22 is coupled to a first input 70 of the phase comparator 56. As explained below, a second input 72 of the phase comparator 56 receives a modulation signal generated by the summation of the output signals of the mixer circuits 66,68. The output signal of the phase comparator 56 is coupled to the voltage controlled oscillator 58 via a low pass filter 78. The voltage controlled oscillator 58 in conjunction with the phase comparator 56 functions to generate a carrier signal phase modulated in accordance with the modulation signal. The modulated carrier signal 76 output by the voltage controlled oscillator 58 is coupled to the power amplifier 28 and then transmitted via an orthomode transducer 74 to an antenna 12. The power amplifier 28 comprises a saturated (i.e., non-linear) amplifier.

The output of the voltage controlled oscillator 58 is also coupled to a frequency divider 60 which downconverts the modulated carrier signal 76 to a second IF signal 75. This second IF signal 75 is coupled to the input of the quadrature hybrid 64. A first output of the quadrature hybrid 64 remains in phase with the second IF signal 75 and is coupled to an input of the first mixer circuit 66. A second output of the quadrature hybrid 64 is 90 degrees out of phase with the second IF signal 75 and is coupled to an input of the second mixer circuit 68. The I and Q quadrature signals 38,40 are also coupled to second inputs of the first and second mixer circuits 66,68, respectively. The output of the first and second mixer circuits 66,68 are summed so as to form a frequency modulated signal containing the modulation formation of the final modulation signal 76. This signal 91 is then divided from the second intermediate frequency to the first intermediate frequency and coupled to the second input 72 of the phase comparator 56 to complete the phase-locked loop.

The transmitter 20 of the present invention utilizes the minimum shift keying modulation technique to produce a modulated carrier signal 76 having a constant amplitude envelope and a continuous phase waveform. As a result, only the phase of the modulated carrier signal 76 is modulated and a high power non-linear amplifier 28 can be utilized to amplify the modulated carrier signal 76.

Referring again to FIG. 2, as stated, the outdoor unit 14 of the VSAT network 10 also comprises a receiver chain 80 for receiving the downlink signal from the satellite. The receiver chain 80 comprises a low noise amplifier and a downconverter which transforms the received signal into a corresponding intermediate frequency signal. This signal is then coupled to the indoor unit 16, where it is further demodulated so as to create the data transmitted from the central hub station 2, which is then processed accordingly. The low noise amplifier and downconverter of the receiver chain 80 are supplied power as described above that the indoor unit 16 can receive commands transmitted from the central hub station 2.

Figure 3:
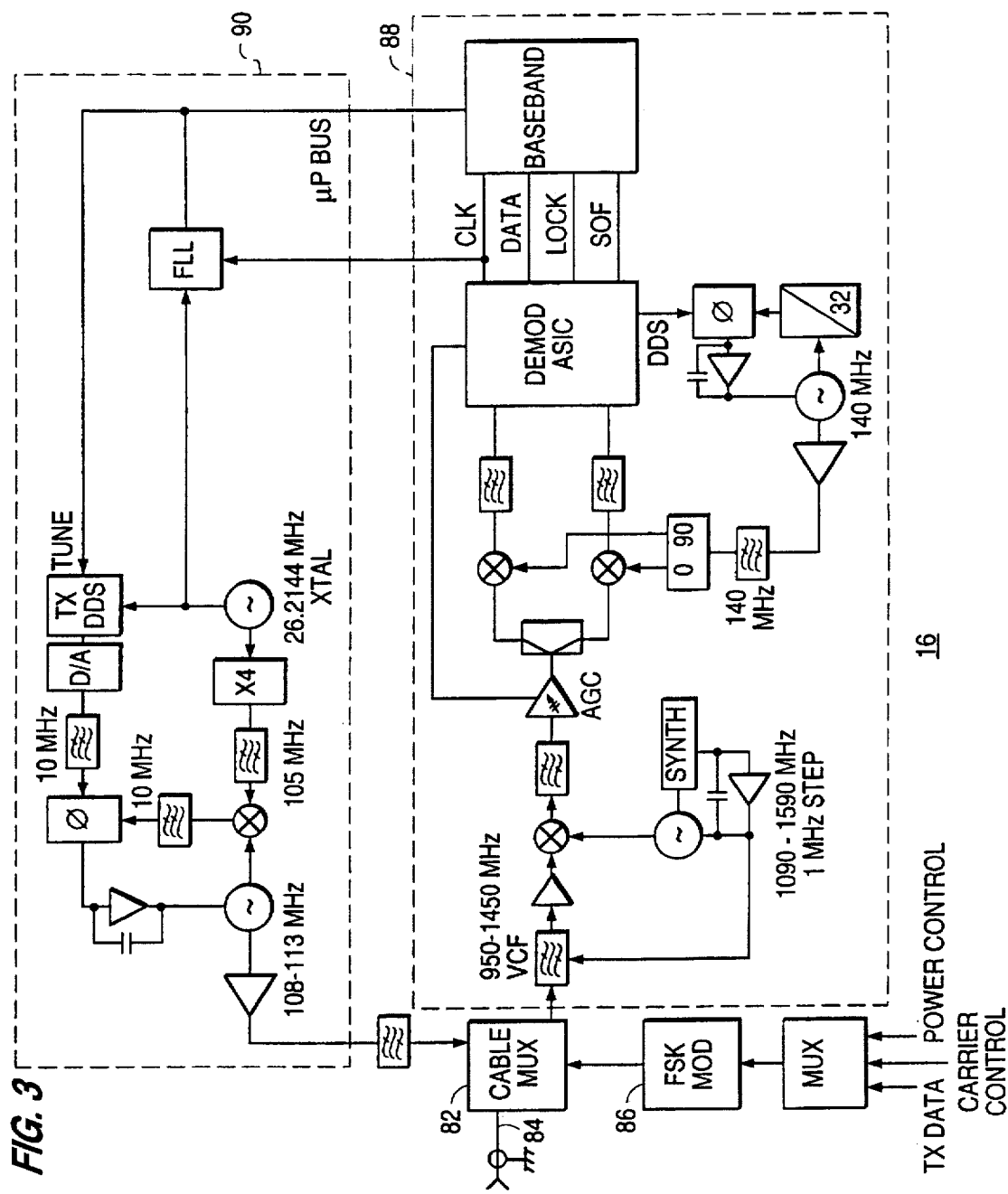
FIG. 3 is a schematic diagram of one embodiment of an indoor unit of the VSAT satellite communication network of FIG. 1.

FIG. 3 illustrates one embodiment of the indoor unit 16 of the VSAT network 10 of FIG. 1. As shown in FIG. 3, the indoor unit 16 comprises a multiplexor 82 having an input/output port 84 which is coupled to the multiplexor 30 of the outdoor unit 14 via a cable. The indoor unit 16 also comprises a modulation circuit 86 which generates the 40 MHz signal and impresses upon that signal the data to be transferred to the outdoor unit 14, and the carrier control signal. Specifically, the modulator 86 receives its input from a multiplexor circuit which combines the data to be transmitted with the carrier control signal. Modulator 86 may have any of a number of known configurations, including a PSK modulator (as shown), a frequency modulator (FSK), or the like. As stated, the carrier control signal is utilized in the outdoor unit to enable the power amplifier 28 of the transmitter 20.

The indoor unit 16 further comprises a receiver chain 88 for further demodulating and recreating the data contained in the downlink signal. Finally, the indoor unit 16 comprises circuitry 90 for generating the 111 MHz reference signal which is coupled to the input of the phase-locked loop circuit 22 of the transmitter 20 of the present invention. As shown, the frequency of the 111 MHz reference signal can be varied so as to provide predefined steps to accommodate the frequency division multiple access techniques utilized by the VSAT network.

The remote ground terminal of the present invention provides numerous advantages. For example, as the present invention minimizes the power consumption of the remote ground terminal by turning off the transmitter components when the remote ground terminal is in the stand-by mode, the present invention provides a substantial power savings over prior art remote ground terminals.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A remote ground terminal for transmitting a data signal to a satellite, said remote ground terminal comprising:

a source of data signals;

a demodulator coupled to said source of data signals, said demodulator operative to receive a data signal from said source of data signals, and to produce a power control signal during a period the data signal from said source of data signals is present at an input of said demodulator; and a transmitter operative to provide and modulate a carrier signal in accordance with the data signal received from said source of data signals, said transmitter being provided power only when said demodulator produces said power control signal.

2. A remote ground terminal for transmitting a data signal to a satellite according to claim 1, wherein said data signal produced by said source of data signals is a frequency modulated signal which is modulated in accordance with the data to be transmitted to said satellite, said frequency modulated signal being produced only when data is to be transmitted to said satellite.

3. A remote ground terminal for transmitting a data signal to a satellite according to claim 2, wherein said demodulator comprises a detector for detecting the presence of said data signal produced by said source of data signals.

4. A remote ground terminal for transmitting a data signal to a satellite according to claim 3, wherein said detector generates said power control signal when said data signal produced by said source of data signals is present at said demodulator.

5. A remote ground terminal for transmitting a data signal to a satellite according to claim 4, further comprising a power supply circuit comprising a power switch which functions to selectively couple a power supply to a plurality of transmitter components, said power control signal controls said power switch such that said plurality of transmitter components are coupled to said power supply only when said power control signal is generated by said detector.

6. A remote ground terminal for transmitting a data signal to a satellite according to claim 5, wherein said plurality of transmitter components comprise a phase-locked loop circuit, a modulator and a power amplifier.

7. A remote ground terminal for transmitting a data signal to a satellite according to claim 5, wherein said power switch comprises a transistor.

8. A remote ground terminal for transmitting a data signal to a satellite according to claim 5, further comprising:

a receiver operative to receive and demodulate a modulated carrier signal transmitted from the satellite, said receiver being decoupled from said power supply when said demodulator produces said power control signal.

9. A remote ground terminal for transmitting a data signal to a satellite according to claim 4, wherein said power control signal produced by said detector is a digital signal having a logical high and a logical low state, said logical high state output by said detector indicates said data signal produced by said source of data signals is present at said demodulator.

10. A method for transmitting a data signal to a satellite comprising:

receiving a data signal from a data source;

coupling said data signal from said data source to a demodulator which generates a power control signal during the period said data signal from said data source is present at an input of said demodulator;

providing power to a transmitter only when said demodulator produces said power control signal, said transmitter upon receiving power operative to provide and modulate a carrier signal in accordance with the data signal received from said data source.

11. The method of claim 10, wherein said data signal from said data source is a frequency modulated signal which is modulated in accordance with the data to be transmitted to said satellite, said frequency modulated signal being produced only when data is to be transmitted to said satellite.

12. The method of claim 11, wherein said demodulator comprises a detector for detecting the presence of said data signal from said data source and generating said power control signal when said data signal from said data source is present at said demodulator.

13. The method of claim 12, further comprising selectively coupling an output of a power supply circuit to a plurality of transmitter components, said power control signal controlling a power switch disposed in said power supply circuit such that said plurality of transmitter components are coupled to said power supply circuit only when said power control signal is generated by said detector.

14. The method of claim 13, wherein said plurality of transmitter components comprise a phase-locked loop circuit, a modulator and a power amplifier.

15. The method of claim 14, wherein said power switch functions to selectively couple said output of said power supply circuit to each of said plurality of transmitter components, said power switch having an input port for receiving said power control signal, said power control signal controlling each power switch such that said plurality of transmitter components are coupled to said output of said power supply circuit only when said power control signal is generated by said detector.

16. The method of claim 15, wherein each of said power switches comprises a transistor.

17. The method of claim 12, wherein said power control signal produced by said detector is a digital signal having a logical high and a logical low state, said logical high state output by said detector indicates said data signal produced by said data source is present at said demodulator.

18. The method of claim 10, further comprising:

providing power to a receiver operative to receive and demodulate a modulated carrier signal transmitted from the satellite, said receiver being decoupled from said power when said demodulator produces said power control signal.

* * * * *